(12) United States Patent
Togashi

(10) Patent No.: US 10,976,584 B2
(45) Date of Patent: Apr. 13, 2021

(54) INPUT DEVICE

(71) Applicant: SHARP KABUSHIKI KAISHA, Sakai (JP)

(72) Inventor: Yasuyuki Togashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/624,882

(22) PCT Filed: Jun. 21, 2018

(86) PCT No.: PCT/JP2018/023599
§ 371 (c)(1),
(2) Date: Dec. 19, 2019

(87) PCT Pub. No.: WO2019/004049
PCT Pub. Date: Jan. 3, 2019

(65) Prior Publication Data
US 2020/0133043 A1 Apr. 30, 2020

(30) Foreign Application Priority Data
Jun. 28, 2017 (JP) .............................. JP2017-126277

(51) Int. Cl.
*G02F 1/1333* (2006.01)
*G06F 3/01* (2006.01)
*G06F 3/041* (2006.01)

(52) U.S. Cl.
CPC .......... *G02F 1/13338* (2013.01); *G06F 3/016* (2013.01); *G06F 3/0412* (2013.01); *G06F 2203/04102* (2013.01); *G06F 2203/04105* (2013.01)

(58) Field of Classification Search
CPC .... G02F 1/13338; G06F 3/016; G06F 3/0412; G06F 2203/04102; G06F 2203/04105
See application file for complete search history.

(56) References Cited

U.S. PATENT DOCUMENTS

| 2005/0225539 A1 | 10/2005 | Prados |
| 2017/0308167 A1 | 10/2017 | Shibuya |
| 2018/0308325 A1* | 10/2018 | Takeda .................. G06F 3/0414 |

FOREIGN PATENT DOCUMENTS

| JP | 2005-222551 A | 8/2005 |
| JP | 2017-194886 A | 10/2017 |
| WO | 2017/086217 A1 | 5/2017 |

* cited by examiner

*Primary Examiner* — Kenneth B Lee, Jr.
(74) *Attorney, Agent, or Firm* — ScienBiziP, P.C.

(57) ABSTRACT

An input device includes an input receiving member, a base, a pressure sensor, an actuator, and a flexible member. A pressing input operation is performed on the input receiving member. The input receiving member is attached to the base. The pressure sensor is disposed on the base to be in contact with the input receiving member and configured to detect a pressure exerted on the input receiving member during the pressing input operation. The actuator is disposed at least on the input receiving member and configured to vibrate the input receiving member in a direction perpendicular to a pressing direction in which the pressing input operation is performed. The flexible member is attached to the input pressing member and the base. The flexible member is elastically deformable in the pressing direction and a vibrating direction in which the actuator causes a vibration.

14 Claims, 13 Drawing Sheets

INPUT DEVICE

TECHNICAL FIELD

The present invention relates to an input device.

BACKGROUND ART

An example of an input device that includes a touchscreen described in Patent Document 1 has been known. The input device described in Patent Document 1 includes a touchscreen, an actuator, and U-shaped springs. The touchscreen is for inputting instructions by touching or pressing an operation surface. The actuator is configured to control the touchscreen to move in at least one direction relative to a reference. The springs are for mechanical connection between the reference and the touch screen.

RELATED ART DOCUMENT

Patent Document
Patent Document 1: Japanese Unexamined Patent Application Publication No. 2005-222551

Problem to be Solved by the Invention

In the input device described in Patent Document 1, the touchscreen is moved parallel to the operation surface using the actuator. The U-shaped springs are elastically deformable parallel to the operation surface. According to the configuration, detection of pressure created by pressing the touchscreen in a normal direction to the operation surface may be difficult.

DISCLOSURE OF THE PRESENT INVENTION

The present invention was made in view of the above circumstances. An object is to determine whether a pressing input operation is performed.

Means for Solving the Problem

An input device includes an input receiving member, a base, a pressure sensor, an actuator, and a flexible member. A pressing input operation is performed on the input receiving member. The input receiving member is attached to the base. The pressure sensor is disposed on the base to be in contact with the pressure receiving member and configured to detect a pressure exerted on the input receiving member during the pressing input operation. The actuator is disposed at least one the input receiving member and configured to vibrate the input receiving member in a direction perpendicular to a pressing direction in which the pressing input operation is performed. The flexible member is attached to the input pressing member and the base. The flexible member is elastically deformable in the pressing direction and a vibrating direction in which the actuator causes a vibration.

According to the configuration, when the pressing input operation is performed on the input receiving member, the flexible member attached to the input receiving member and the base elastically deforms in the pressing direction in which the pressing input operation is performed. This allows movements of the input receiving member relative to the base in the pressing direction. The pressure exerted on the input receiving member is properly detected by the pressure sensor that is in contact with the input receiving member. Furthermore, an erroneous input can be properly eliminated.

When the actuator oscillates based on the pressure detected by the pressure sensor, the flexible member attached to the input receiving member and the base elastically deforms in the vibrating direction in which the actuator causes the vibration. This allows the movements of the input receiving member relative to the base in the vibrating direction. The input receiving member vibrates in the direction perpendicular to the pressing direction relative to the base. The vibration is transmitted to an input body with which the pressing input operation is performed. As described above, whether the pressing input operation is performed on the input receiving member can be determined. If the pressing input operation is performed, a tactile feedback for the pressing input operation is provided through the vibration of the input receiving member.

Advantageous Effect of the Invention

According to the present invention, whether a pressing input operation is performed can be determined.

MODES FOR CARRYING OUT THE INVENTION

First Embodiment

Figure 1:
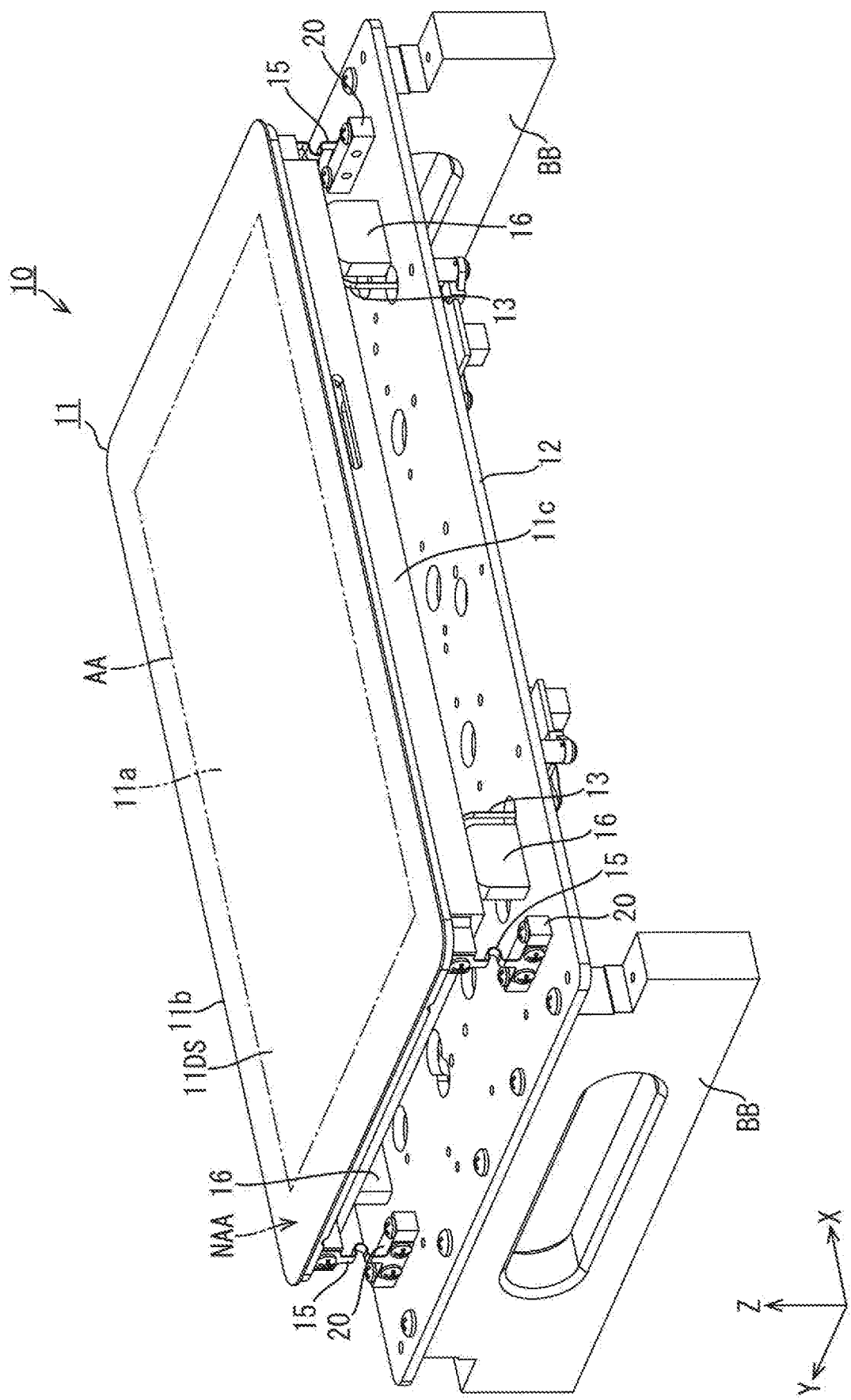
FIG. 1 is a perspective view of an input device according to a first embodiment of the present invention.

A first embodiment of the present invention will be described with reference to FIGS. 1 to 9. In this section, an input device 10 having a tactile feedback function (a tactile sensation feedback function) will be described. X-axes, Y-axes, and Z-axes may be present in the drawings. The axes in each drawing correspond to the respective axes in other drawings. A vertical direction is based on FIGS. 4, 5 and 9. An upper side and a lower side in FIGS. 4, 5 and 9 correspond to a front side and a back side of the input device 10, respectively.

As illustrated in FIG. 1, the input device 10 includes at least a liquid crystal display device 11 (an input receiving member) and a base 12. The liquid crystal display device 11 has a display function for displaying images and a touch panel function (an input location detecting function) for detecting pressing input operations (locations of inputs) by a user. The input device 10 in this embodiment is an example of an input device for a car navigation system installed in a passenger car. However, the application may be altered where appropriate.

Figure 3:
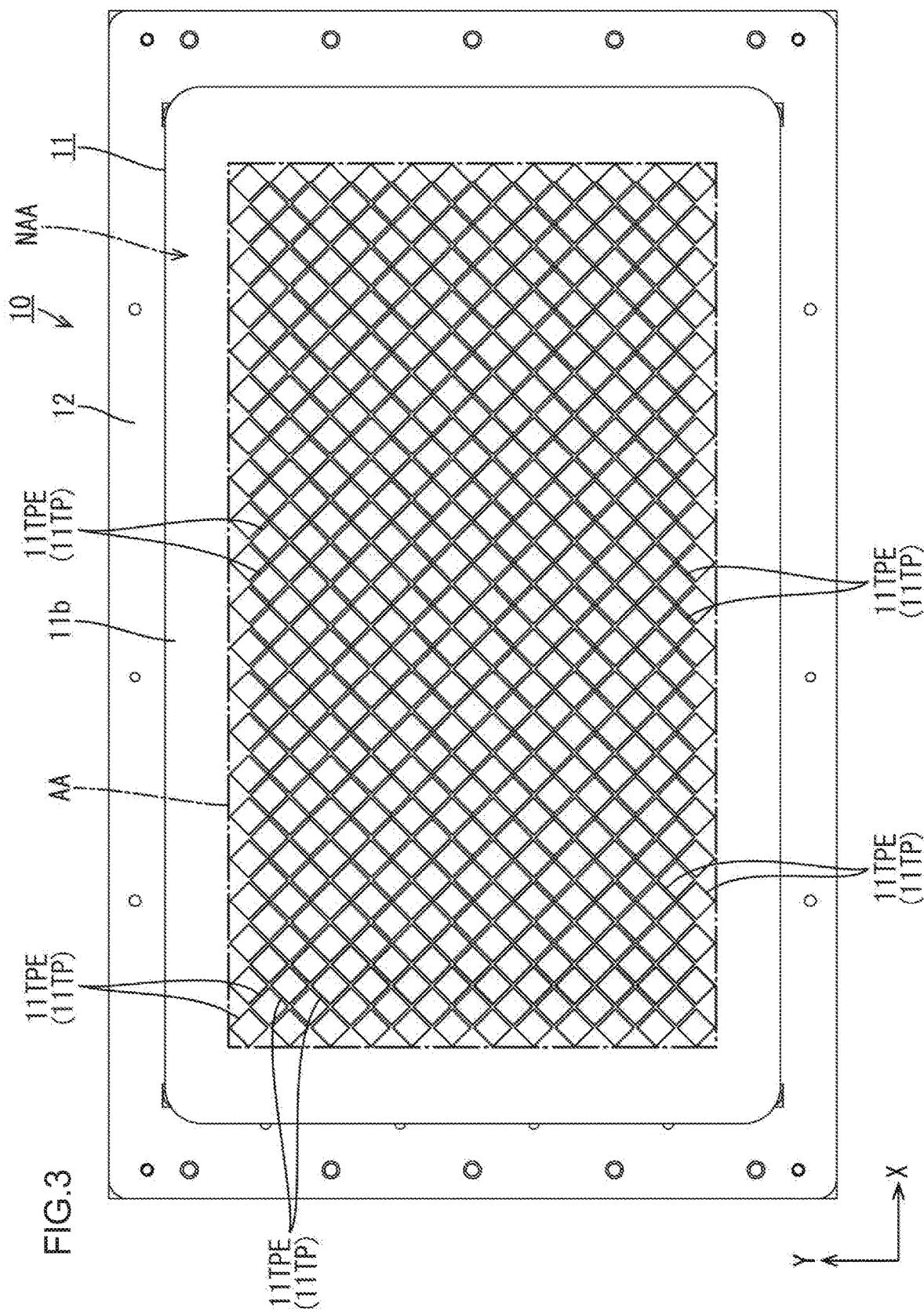
FIG. 3 is a plan view of the input device.

As illustrated in FIGS. 1 and 3, the liquid crystal display device 11 includes at least a liquid crystal panel 11a, a backlight unit (not illustrated), a cover glass 11b (a cover panel, a panel protector), and a case 11c. The images are displayed on the liquid crystal panel 11a. The backlight unit is disposed behind the liquid crystal panel 11a (on an opposite side from a side on which pressing input operations are performed) and configured to apply light to the liquid crystal panel 11a for image display. The cover glass 11b is disposed to overlap the liquid crystal panel 11a from the front side. The case 11c houses the liquid crystal panel 11a and the backlight unit. The liquid crystal panel 11a includes at least a pair of substrates, a liquid crystal layer, and a pair of polarizing plates (the substrates and the liquid crystal layer are not illustrated). The substrates are substantially transparent and made of glass. The substrates are bonded together with a predefined gap (a cell gap) therebetween such that inner surfaces thereof are opposed to each other. The liquid crystal layer is sealed between the substrates. The polarizing plates are disposed on outer surfaces of the substrates. One of the substrates on the front side is a CF substrate (an opposed substrate). Color filters that include red (R), green (G), and blue (B) color portions are arranged in a predefined pattern and a light blocking portion (a black matrix) are disposed on the CF substrate. Furthermore, structural objects including an alignment film are disposed on the CF substrate. The other substrate on the rear side is an array substrate (a TFT substrate). Structural objects including switching components (e.g., TFTs), pixel electrodes, and an alignment film are disposed on the array substrate. The switching components are connected to source lines and gate lines that are perpendicular to each other. The pixel electrodes are connected to the switching components.

As illustrated in FIG. 3, the liquid crystal panel 11a has a horizontally-long rectangular shape in a plan view. A display surface 11DS of the liquid crystal panel 11a includes a display area (active area) AA and a non-display area (non-active area) NAA. The images are displayed in the display area AA. The non-display area NAA has a frame shape to surround the display area AA. Long edges of the liquid crystal panel 11a correspond with the X-axis direction in each drawing. Short edges of the liquid crystal panel 11a correspond with the Y-axis direction in each drawing. The normal direction to the display surface 11DS corresponds with the Z-axis direction in each drawing. In FIG. 3, a chain line indicates an outline of the display area AA. An area that is outer than the chain line is the non-display area NAA. The liquid crystal panel 11a includes an embedded touch panel pattern 11TP for detecting locations of the pressing input operations by the user. The touch panel pattern 11TP uses a projected capacitive technology and a detection method uses self-capacitances. The touch panel pattern 11TP includes at least touch electrodes 11TPE (location detection electrodes) arranged in a matrix in the display area AA. The display area AA of the liquid crystal panel 11a substantially corresponds with a touch area in which locations of the pressing input operations are detectable. The non-display area substantially corresponds with a non-touch area in which locations of the pressing input operations are not detectable. When a pressing input operation is performed with a finger based on an image displayed in the display area and viewed by the user, the finger and the corresponding touch electrode 11TPE form a capacitor. A capacitance detected by the corresponding touch electrode 11TPE closer to the finger varies as the finger approaches the corresponding touch electrode 11TPE. The capacitance differs from the capacitance detected by the touch electrodes 11TPE farther from the finger. The location of the pressing input operation is detectable based on the difference.

As illustrated in FIG. 1, the cover glass 11b has a horizontally-long rectangular slightly larger than the liquid crystal panel 11a. The cover glass 11b covers about an entire area of the liquid crystal panel 11a from the front side to protect the liquid crystal panel 11a. The cover glass 11b is made of glass that is substantially transparent and has high transmissivity. The cover glass 11b has a plate shape. Preferably, the cover glass 11b is made of tempered glass. The tempered glass used for the cover glass 11b may be preferably, but not limited to a chemically tempered glass that includes a chemically tempered layer on a surface through chemical tempering processing on a surface of the glass substrate having a plate shape. The case 11c has a box shape with an opening on the front side and a storing space for storing the liquid crystal panel 11a and the backlight unit therein.

As illustrated in FIGS. 1 and 3, the base 12 is fixed to base blocks BB that are prepared from horizontally-long rectangular boards in a plan view and installed in a dashboard of a passenger car (not illustrated). Two base blocks BB are disposed to overlap short edges among outer edges of the base 12. The base blocks BB project from a mounting surface of the dashboard toward the front side. The base 12 has a size in a plan view slightly larger than the liquid crystal display device 11. The base 12 includes holes (screw holes) in a plate surface for mounting components (e.g., a pressure sensor 13, an actuator 14, and flexible members 15). If the base 12 can be directly fixed to the dashboard, the base blocks BB are not required.

Figure 2:
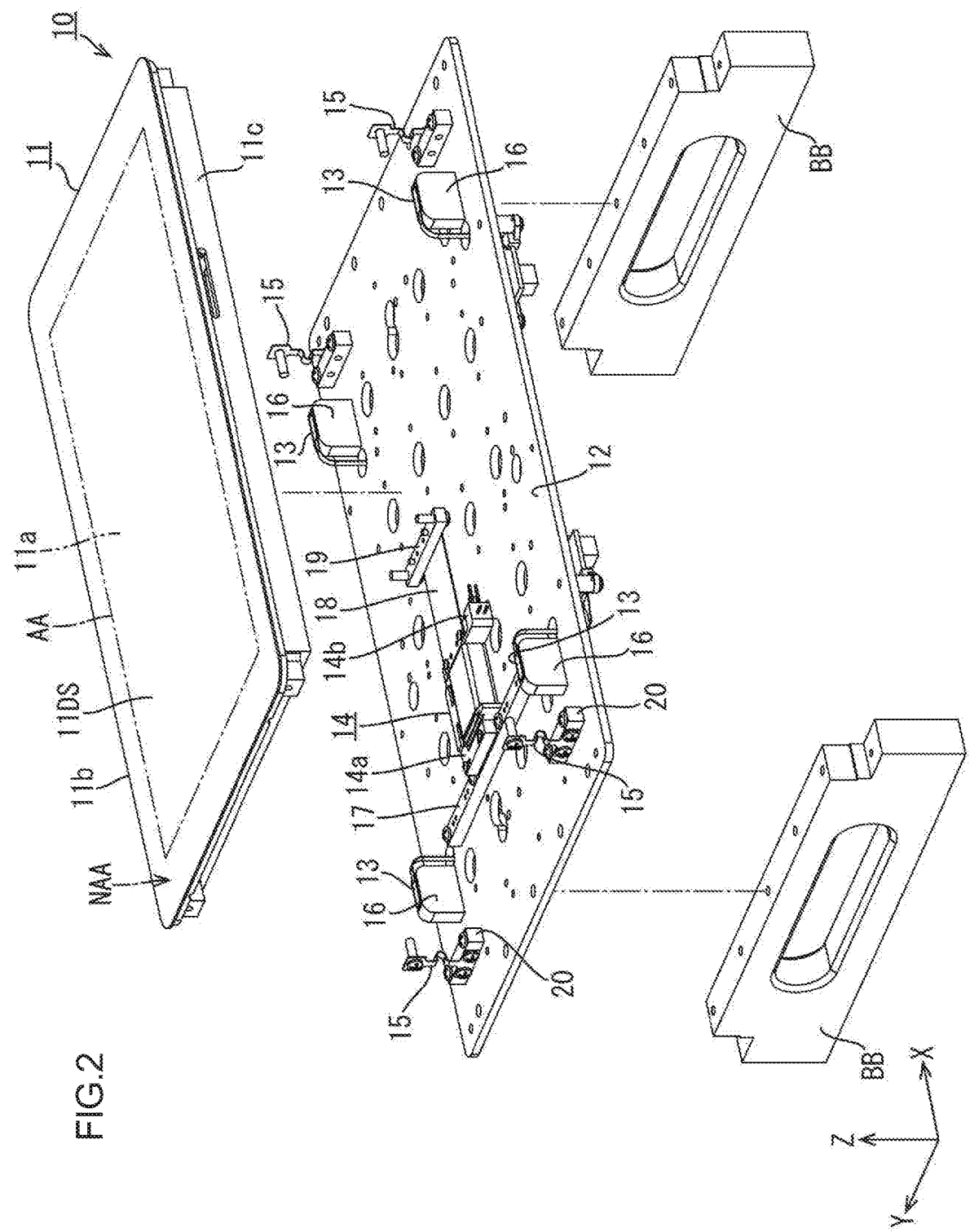
FIG. 2 is an exploded perspective view of the input device.

As illustrated in FIG. 2, at least the pressure sensors 13 (pressor sensitive sensors), the actuator 14, and the flexible members 15 are attached to the base 12. The pressure sensors 13 detect pressures exerted on the liquid crystal display device 11 when pressing operations are performed. The actuator 14 is configured to oscillate the liquid crystal display device 11. The flexible members 15 hold the liquid crystal display device 11 with flexibility so that the liquid crystal display device 11 is movable relative to the base 12. The liquid crystal display device 11 held by the flexible members 15 is a predefined distance away from the base 12 in the Z-axis direction.

Figure 4:
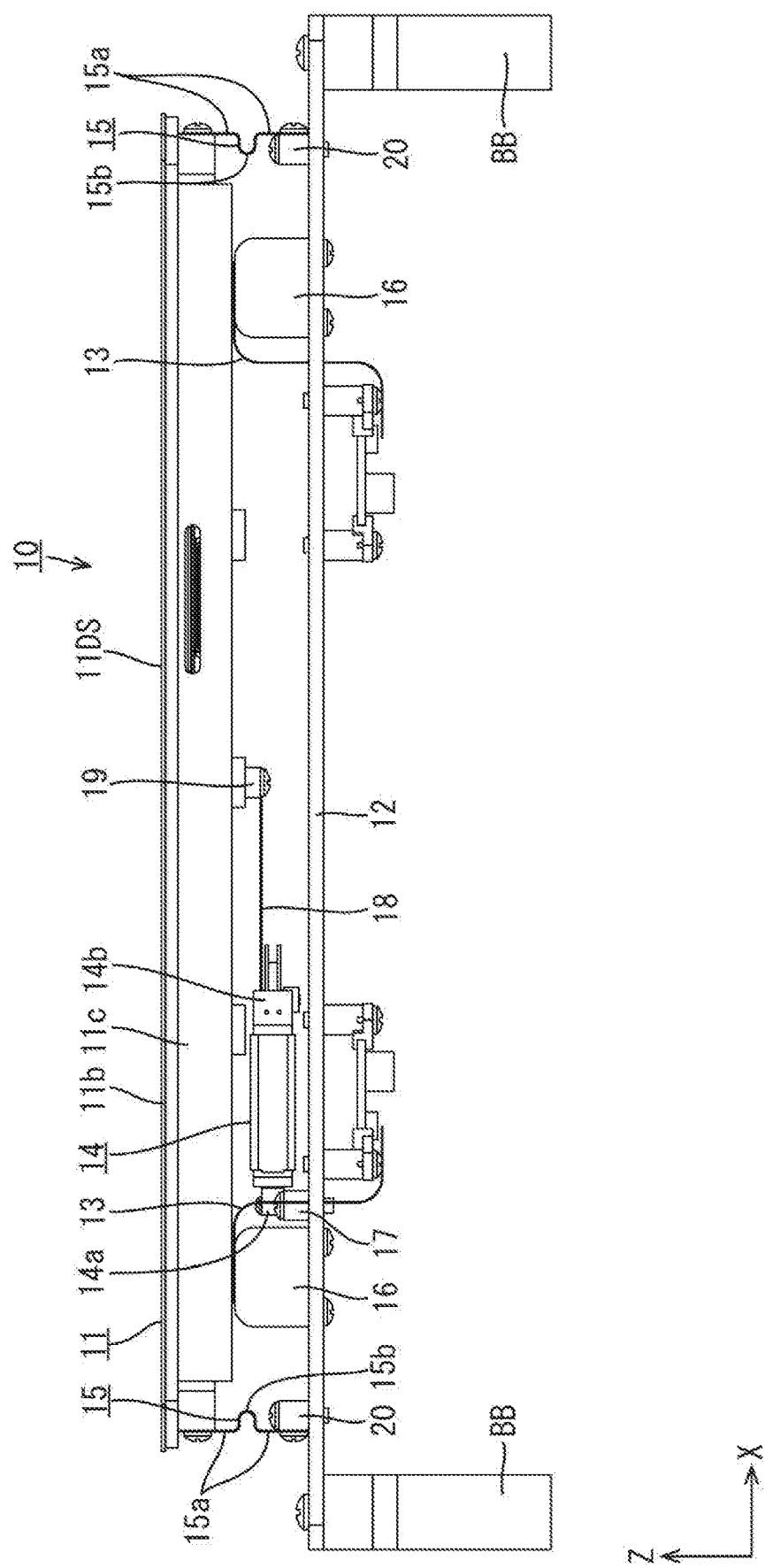
FIG. 4 is a side view of the input device.

As illustrated in FIGS. 2 and 4, the pressure sensors 13 using a pressure sensitive ink method include band shaped sheets that extend in the X-axis direction. Each pressure sensor 13 includes at least two films and pressure sensitive electrodes (the films and the pressure sensitive electrode are not illustrated). The films are made of an insulating material and bonded together. The pressure sensitive electrodes are disposed on inner surfaces of the films and opposed to each other. Each pressure sensor 13 detects pressures based on variations in contact resistance between the pressure sensitive electrodes that are opposed to each other. The contact resistance varies according to pressures exerted on the pressure sensors 13 in a thickness direction (the Z-axis direction). The pressure sensitive electrodes may be formed by printing on the films using pressure sensitive ink. Sensor holders 16 are mounted on the base 12 for holding the pressure sensors 13 by sandwiching the pressure sensors 13 with the liquid crystal display device 11. Each sensor holder 16 has a block shape. The sensor holders 16 are protrude from the plate surface of the base 12 on the front side toward the liquid crystal display device 11 in the Z-axis direction. Surfaces of the sensor holders 16 opposed to the liquid crystal display device 11 are supporting surfaces for supporting the pressure sensors 13 from the rear side. Ends of the opposed surfaces are chamfered. Sections of the pressure sensors 13 supported by the sensor holders 16 are held in contact with the back surface of the liquid crystal display device 11 or adjacent to the back surface of the liquid crystal display device 11 without contact. A first end of each pressure sensor 13 is supported by the corresponding sensor holder 16 in an extending direction of the pressure sensor 13 (the X-axis direction). A second end of each pressure sensor 13 is drawn to the back of the base 12 and connected to a controller via a connector (the controller and the connector are not illustrated). Four pressure sensors 13 and four sensor holders 16 are provided. The pressure sensors 13 and the sensor holders 16 are disposed at corners of the liquid crystal display device 11 or the base 12.

Figure 6:
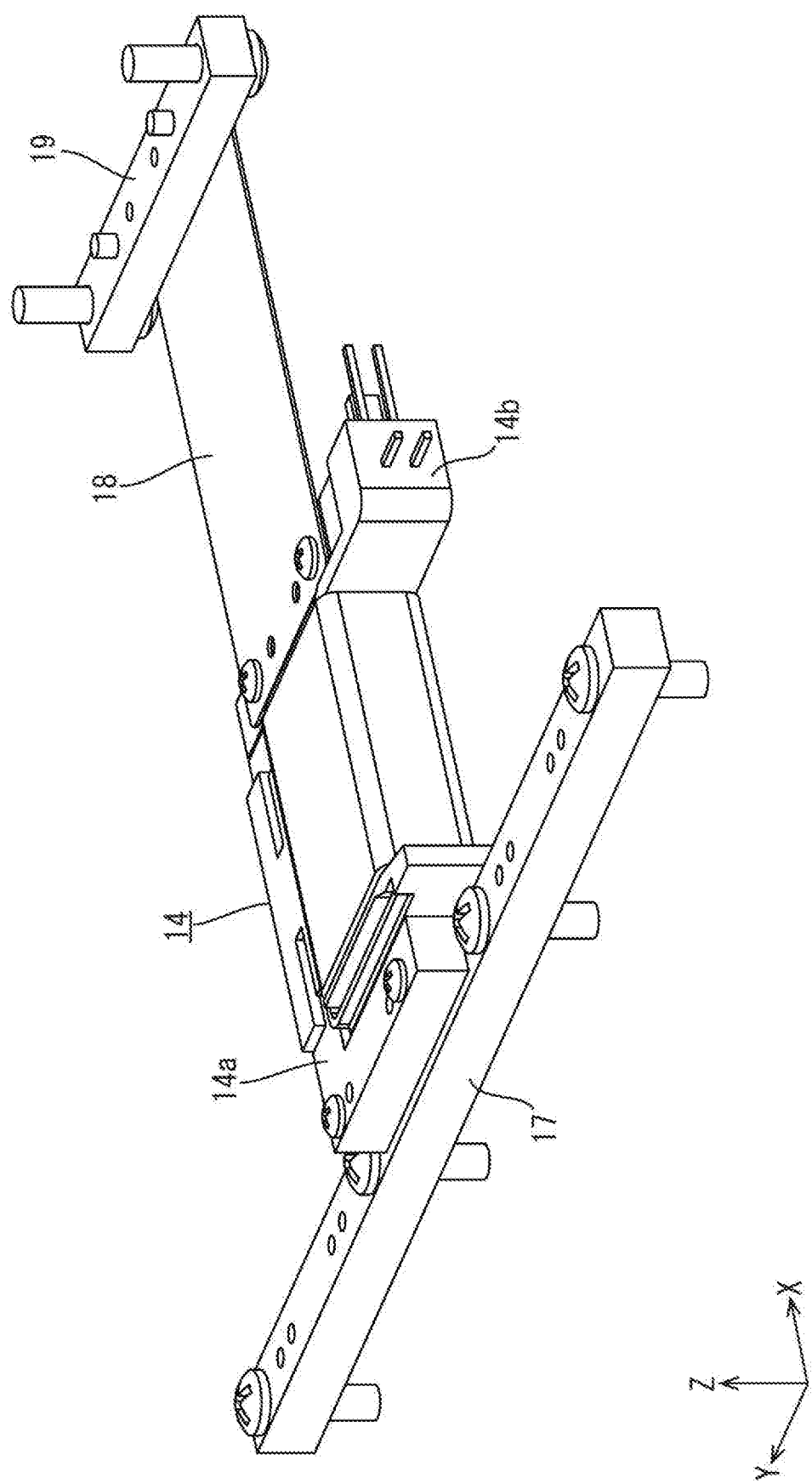
FIG. 6 is a perspective view of an actuator included in the input device.
Figure 7:
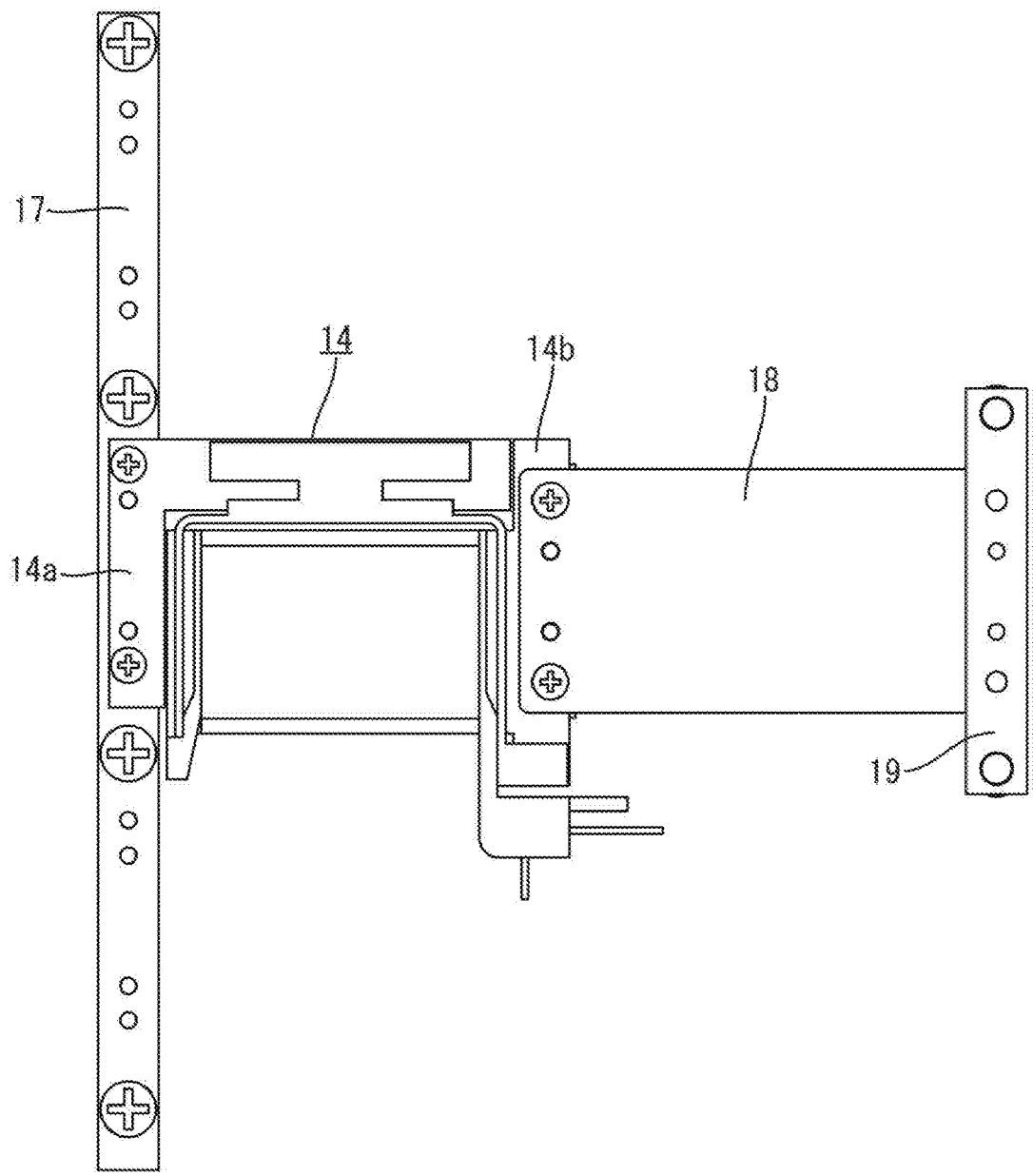
FIG. 7 is a plan view of the actuator included in the input device.

As illustrated in FIGS. 6 and 7, the actuator 14 is an electromagnetic actuator (a solenoid actuator) and includes a fixed portion 14a and a movable portion 14b. The fixed portion 14a is attached to the base 12. The movable portion 14b is attached to the liquid crystal display device 11 to be movable relative to the fixed portion 14a in the X-axis direction (a vibrating direction). The fixed portion 14a includes at least a fixed magnetic pole and a coil wound around the fixed magnetic pole, which are not illustrated. The movable portion 14b includes at least a movable magnetic pole (not illustrated) that is movable relative to the fixed magnetic pole. In the actuator 14, the movable portion 14b moves toward the fixed portion 14a in the X-axis direction when a magnetic field is generated around the fixed magnetic pole through energization of the coil and the movable magnetic pole is pulled. According to the mechanism, the liquid crystal display device 11 to which the movable portion 14b is attached vibrates in the X-axis direction (a direction perpendicular to the pressing direction in the pressing operation) relative to the base 12 to which the fixed portion 14a is attached. The movable portion 14b of the actuator 14 is fixed to a plate spring 18 that extends in the X-axis direction with screws. The plate spring 18 is prepared from a metal (e.g. stainless steel) flat plate. The plate spring 18 includes a plate surface parallel to the display surface 11DS of the liquid crystal display device 11 and the plate surfaces of the base 12. The plate spring 18 is elastically deformable in the Z-axis direction (the pressing direction) normal to the plate surface of the plate spring 18. The plate spring 18 includes a first end and a second end with respect to the X-axis direction. The first end is connected to the movable portion 14b with screws. The second end is connected to a movable-side bracket 19 having a block shape and being connected to the case 11c of the liquid crystal display device 11 with screws. The plate spring 18 is elastically deformable at the first end fixed to the movable portion 14b. According to the elastic deformation, the second end moves relative to the first end in the Z-axis direction. Because the liquid crystal display device 11 is fixed to the second end of the plate spring 18 with the movable-side bracket 19, the liquid crystal display device 11 moves in the Z-axis direction according to the elastic deformation of the plate spring 18.

Figure 5:
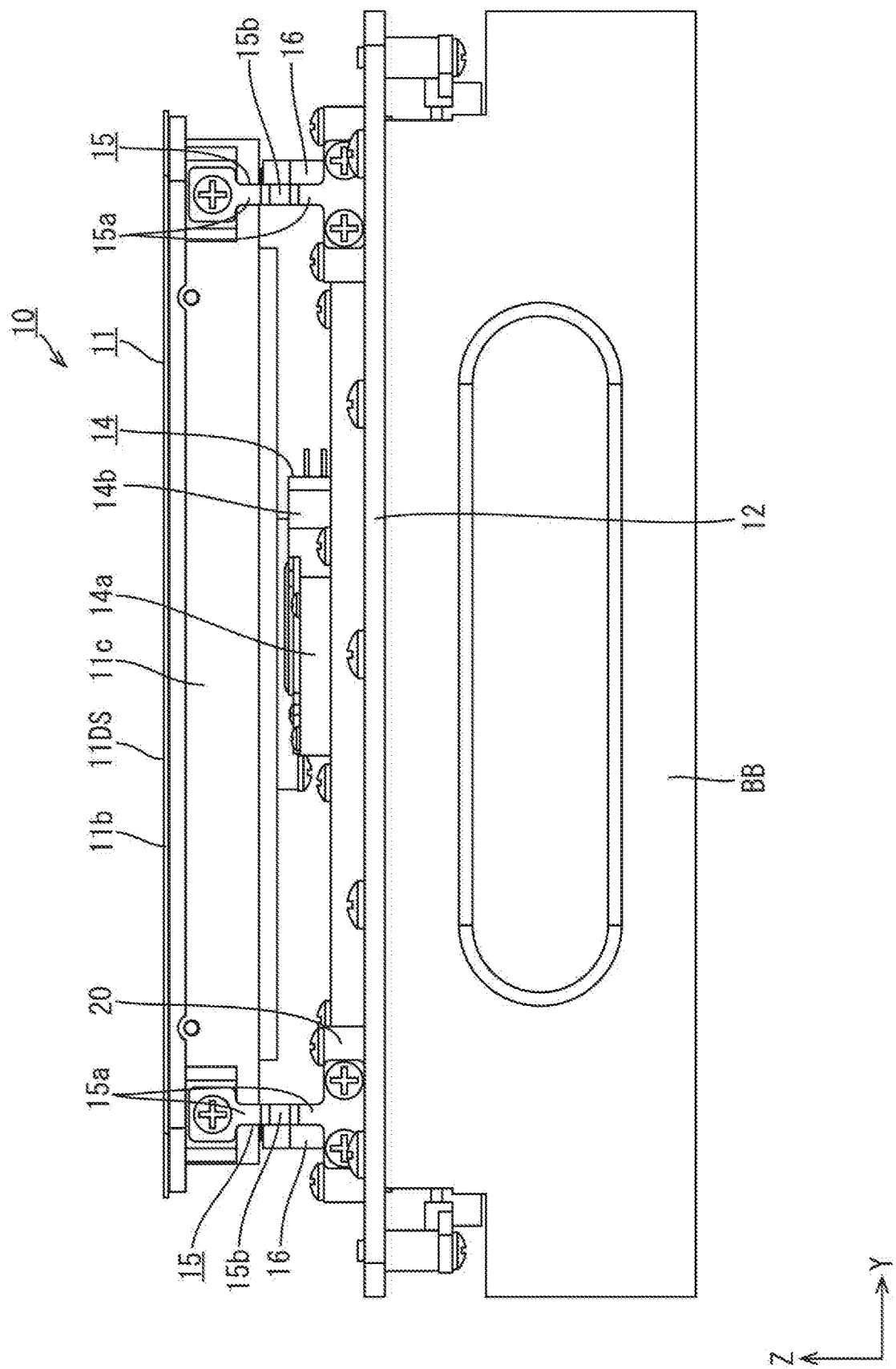
FIG. 5 is a front view of the input device.

As illustrated in FIGS. 2, 4 and 5, the actuator 14 is disposed inner (closer to the center) of the liquid crystal display device 11 relative to the pressure sensors 13 at the corners of the liquid crystal display device 11 or the flexible members 15, which will be described later, on the base 12. Specifically, the actuator 14 is disposed at about the middle of the liquid crystal display device 11 with respect to a short edge (the Y-axis direction) within the plate surface of the base 12. Furthermore, the actuator 14 is closer to the center relative to and adjacent to the pressure sensor 13 on the right in FIG. 4 with respect to a long edge (the X-axis direction) of the liquid crystal display device 11. Namely, the actuator 14 is surrounded by the pressure sensors 13 (the flexible members 15) at the corners of the liquid crystal display device 11. The actuator 14 is disposed such that the movable-side bracket 19 fixed to the second end of the plate spring 18 is attached to a section of the liquid crystal display device 11 in about the middle with respect to the X-axis direction. When the actuator 14 oscillates, the vibration of the movable portion 14b with respect to the X-axis direction is transmitted to a section of the display surface 11DS of the liquid crystal display device 11 at about the center with the plate spring 18 and the movable-side bracket 19.

Figure 8:
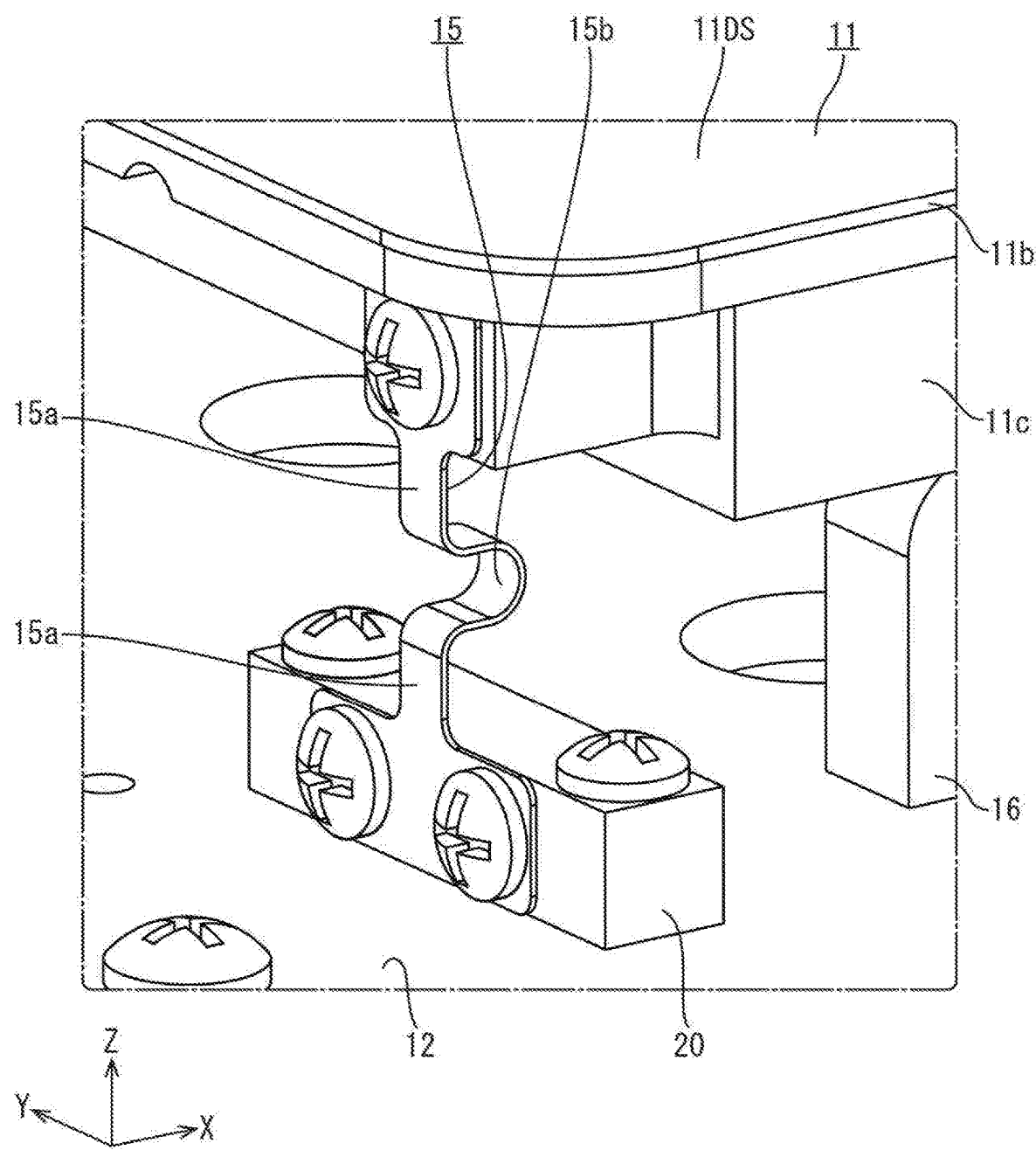
FIG. 8 is a magnified perspective view of a section of the input device including a flexible member.

The flexible members 15 are formed by pressing metal plates. As illustrated in FIG. 1, the flexible members 15 hold the liquid crystal display device 11 at a position away from the base 12 in the Z-axis direction on the front side. As illustrated in FIG. 8, each flexible member 15 includes two first spring portions 15a and one second spring portion 15b. The first spring portions 15a extend in the Z-axis direction (the pressing direction). The second spring portion 15b is coupled to the first spring portions 15a. The second spring portion 15b extends in the X-axis direction (a direction that crosses the pressing direction) and turns. The first spring portions 15a include a front first spring portion 15a and a rear first spring portion 15a. The front first spring portion 15a is disposed on the front side with respect to the Z-axis direction and a first end thereof is attached to the liquid crystal display device 11. The rear first spring portion 15a is disposed on the rear side and a first end thereof is attached to the base 12. The first end of the front first spring portion 15a having a larger width is fixed to the outer surface of the case 11c of the liquid crystal display device 11 with one screw. The first end of the rear first spring portion 15a having a width larger than the width of the first end of the front first spring portion 15a is fixed to a flexible member bracket 20 attached to the base 12 with two screws. The flexible member bracket 20 has a block shape. The first spring portions 15a are elastically deformable in the X-axis direction (the vibrating direction) at sections thereof fixed to the liquid crystal display device 11 and the base 12. The second spring portion 15b has a U shape when viewed from a side. Ends of the second spring portion 15b are coupled to second ends of the first spring portions 15a. The second spring portion 15b extends from the second ends of the first spring portions 15a in the X-axis direction to the inner side (the center) of the liquid crystal display device 11 and turns. The second spring portion 15b is elastically deformable in the Z-axis direction at a turning section thereof. The flexible members 15 are elastically deformable in the X-axis direction and the Z-axis direction. The flexible members 15 hold the liquid crystal display device 11 such that the liquid crystal display device 11 is elastically movable relative to the base 12 in the X-axis direction and the Z-axis direction.

As illustrated in FIGS. 2, 4 and 5, the flexible members 15 and the flexible member brackets 20 are disposed at the corners of the liquid crystal display device 11 and the base 12. The flexible members 15 and the flexible member brackets 20 are disposed outer than the pressure sensors 13 and the sensor holders 16 closer to the corners of the liquid crystal display device 11 and the base 12 with respect to the X-axis direction. The second spring portions 15b of four flexible members 15 are disposed to project inward relative to the first spring portions 15a, that is, toward the pressure sensors 13 and the sensor holders 16.

Figure 9:
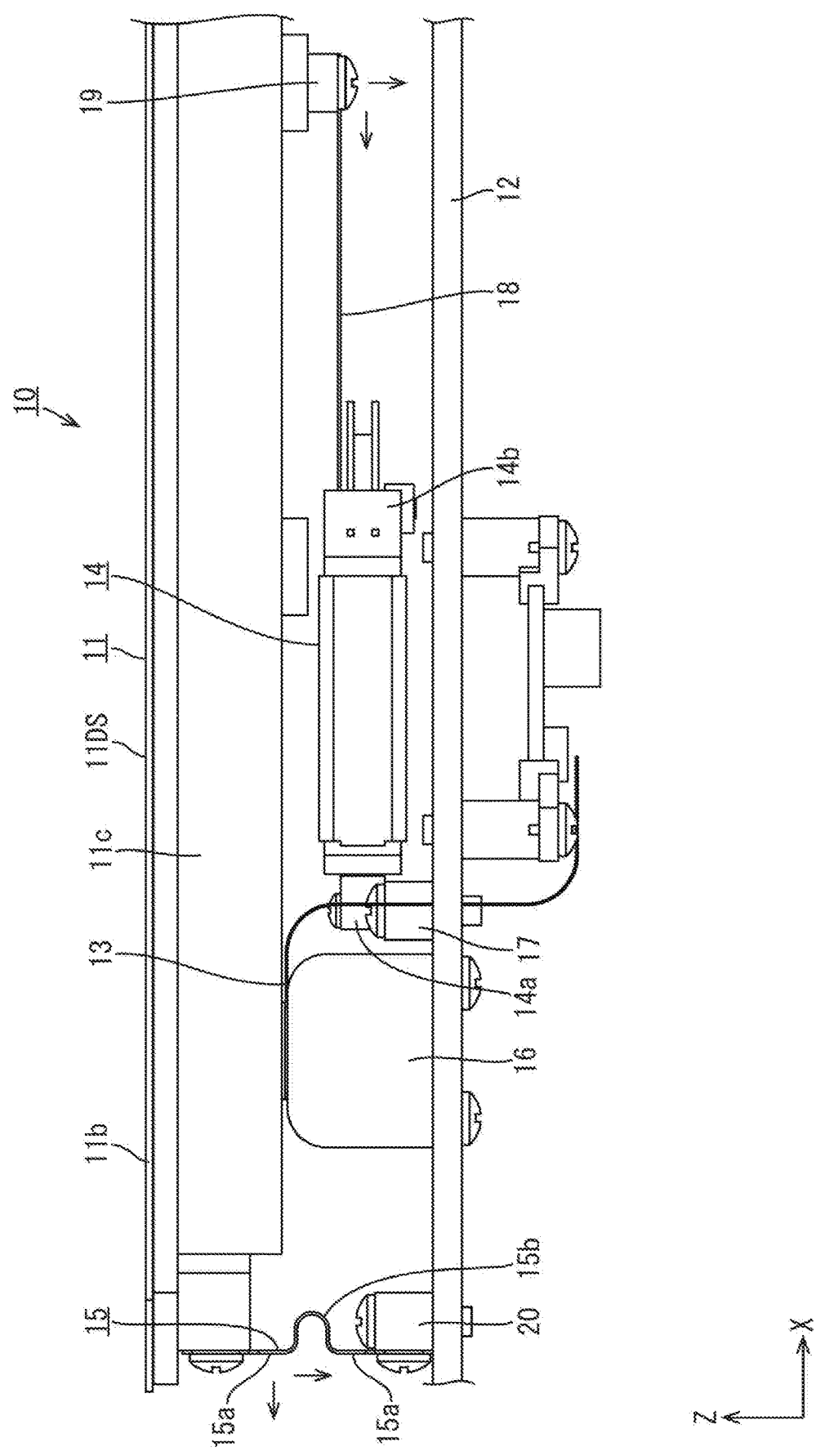
FIG. 9 is a magnified side view of a section of the input device including the flexible member, a pressure sensor, and the actuator.

This embodiment has the configuration described above. Next, functions and operations of this embodiment will be described. When the user presses the surface of the cover glass lib with his or her finger to perform a pressing input operation within the display surface 11DS of the liquid crystal display device 11, the second spring portions 15b of the flexible members 15 fixed to the liquid crystal display device 11 and the base 12 elastically deform in the Z-axis direction that corresponds with the pressing direction of the pressing input operation. This allows movements of the liquid crystal display device 11 relative to the base 12 in the Z-axis direction. The pressure sensors 13 sandwiched between the liquid crystal display device 11 and the sensor holders 16 properly detect pressures exerted by the liquid crystal display device 11 that approaches the sensor holders 16 in the Z-axis direction. If the user accidentally touches the cover glass lib without an intention of the pressing input operation, the liquid crystal display device 11 is less likely to move in the Z-axis direction. The pressures may not be detected by the pressure sensors 13 or the detected pressures may not exceed a threshold. Therefore, erroneous inputs can be eliminated. When the pressing input operation is performed, the touch panel pattern 11TP on the liquid crystal panel 11a included in the liquid crystal display device 11 can detect a location of the pressing input operation. In FIG. 9, a direction in which the flexible members 15 elastically deform according to the pressing input operation is indicated by a down arrow near the flexible member 15.

When the pressing input operation is performed on the liquid crystal display device 11 and the liquid crystal display device 11 moves toward the base 12 in the Z-axis direction, the second end of the plate spring 18 that includes the first end fixed to the movable portion 14b of the actuator 14 moves toward the rear side in the Z-axis direction as illustrated in FIG. 9. The second end of the plate spring 18 is fixed to the liquid crystal display device 11 with the movable-side bracket 19. The plate spring 18 elastically deforms in the Z-axis direction at the first end. This reduces a stress on the actuator 14. In FIG. 9, a direction in which the plate spring 18 elastically deforms according to the pressing input operation is indicated by a down arrow near the movable-side bracket 19.

If the pressures detected by the pressure sensors 13 when the pressing input operation is performed exceed the threshold, the controller determines that the pressing input operation is properly performed. The actuator 14 oscillates based on the determination. The oscillation of the actuator 14 can be controlled based on the location of the pressing input operation detected by the touch panel pattern 11TP where appropriate. When the actuator 14 oscillates, the first spring portions 15a of the flexible members 15 attached to the liquid crystal display device 11 and the base 12 elastically deform in the X-axis direction that corresponds with a vibrating direction in which the actuator 14 causes a vibration. This allows the movements of the liquid crystal display device 11 relative to the base 12 in the X-axis direction. Specifically, the movable portion 14b attached to the liquid crystal display device 11 moves in the X-axis direction toward the fixed portion 14a attached to the base 12 during the oscillation of the actuator 14. As a result, the liquid crystal display device 11 vibrates relative to the base 12 in the X-axis direction. The vibration of the liquid crystal display device 11 relative to the base 12 in the X-axis direction that corresponds with the direction perpendicular to the pressing direction is transmitted to the finger of the user (an input body) who has performed the pressing input operation. When the finger feels the vibration in the X-axis direction parallel to the display surface 11DS, the user feels as if the user presses a virtual button in the Z-axis direction on the display surface 11DS because of a lateral force field phenomenon. Whether the pressing input operation is performed on the liquid crystal display device 11 can be determined. If the pressing input operation is performed, the tactile feedback for the pressing input operation is provided through the vibration of the liquid crystal display device 11. The actuator 14 that causes the vibration of the liquid crystal display device 11 is the electromagnetic actuator that includes the fixed portion 14a and the movable portion 14b. In comparison to an inertial drive actuator, a stronger vibration can be produced. This configuration is preferable for the tactile feedback. In FIG. 9, the direction in which the flexible members 15 elastically deform according to the oscillation of the actuator 14 and the direction in which the liquid crystal display device 11 vibrates are indicated by a left arrow.

As illustrated in FIGS. 2, 4 and 5, four pressure sensors 13 and four flexible members 15 are disposed at the corners of the liquid crystal display device 11. Therefore, the liquid crystal display device 11 can smoothly move relative to the base 12 in the Z-axis direction when the pressing input operation is performed. Furthermore, the pressures on the liquid crystal display device 11 resulting from the pressing input operation are properly detected. The actuator 14 is disposed on the inner side of the liquid crystal display device 11 relative to the pressure sensors 13 and the flexible members 15. Therefore, the entire liquid crystal display device 11 properly vibrates. The second end of the plate spring 18 that includes the first end attached to the movable portion 14b of the actuator 14 is attached to the movable-side bracket 19 that is fixed to the middle of the liquid crystal display device 11 with respect to the X-axis direction and the Y-axis direction. Therefore, the entire liquid crystal display device 11 more properly vibrates.

As described above, the input device 10 in this embodiment includes the liquid crystal display device 11 (the input receiving member), the base 12, the pressure sensors 13, the actuator 14, and the flexible members 15. The pressing input operations are performed on the liquid crystal display device 11. The liquid crystal display device 11 is attached to the base 12. The pressure sensors 13 are disposed on the base 12 such that the pressure sensors 13 can contact the liquid crystal display device 11. The pressure sensors 13 detect the pressures exerted on the liquid crystal display device 11 during the pressing input operations. The actuator 14 is disposed on at least the liquid crystal display device 11 to vibrate the liquid crystal display device 11 in the direction perpendicular to the pressing direction in the pressing input operations. The flexible members 15 are attached to the liquid crystal display device 11 and the base 12 and elastically deformable in the pressing direction and the vibrating direction in which the actuator 14 causes the vibration.

When the pressing input operation is performed on the liquid crystal display device 11, the flexible members 15 that are attached to the liquid crystal display device 11 and the base 12 elastically deform in the pressing direction in the pressing input operation. This allows the movements of the liquid crystal display device 11 relative to the base 12 in the pressing direction. The pressures exerted on the liquid crystal display device 11 are properly detected by the pressure sensors 13 that contact the liquid crystal display device 11 and erroneous inputs can be properly eliminated. When the actuator 14 oscillates based on the pressures detected by the pressure sensors 13, the flexible members attached to the liquid crystal display device 11 and the base 12 elastically deform in the vibrating direction in which the actuator 14 causes the vibration. This allows the movements of the liquid crystal display device 11 relative to the base 12 in the vibrating direction. The liquid crystal display device 11 vibrates in the direction perpendicular to the pressing direction relative to the base 12. The vibration is transmitted to the input body with which the pressing input operation is performed. Whether the pressing input operation is performed on the liquid crystal display device 11 is determined. When the pressing input operation is performed, the tactile feedback for the pressing input operation is provided through the vibration of the liquid crystal display device 11.

The actuator 14 is the electromagnetic actuator and includes the fixed portion 14a and the movable portion 14b. The fixed portion 14a is attached to the base 12. The movable portion 14b is attached to the liquid crystal display device 11 to be movable relative to the fixed portion 14a in the vibrating direction. According to the configuration, the movable portion 14b attached to the liquid crystal display device 11 moves in the vibrating direction relative to the fixed portion 14a attached to the base 12. Therefore, the liquid crystal display device 11 vibrates relative to the base 12. In comparison to the inertial drive actuator, the actuator 14, which is the electromagnetic actuator including the fixed portion 14a and the movable portion 14b, a stronger vibration can be produced. This configuration is preferable for the tactile feedback.

The plate spring 18 extends in the vibrating direction and includes the first end attached to the movable portion 14b and the second end attached to the liquid crystal display device 11. The plate spring 18 is elastically deformable in the pressing direction. When the pressing input operation is performed on the liquid crystal display device 11 and the liquid crystal display device 11 moves toward the base 12 in the pressing direction, the plate spring 18 that extends in the vibrating direction and includes the first end attached to the movable portion 14b and the second end attached to the liquid crystal display device 11 elastically deform in the pressing direction. This reduces a stress exerted on the actuator 14.

Each flexible member 15 includes the first spring portions 15a and the second spring portion 15b. The first spring portions 15a extend in the pressing direction and include the first ends attached to the liquid crystal display device 11 or the base 12. The second spring portion 15b is coupled to the second ends of the first spring portions 15a. The second spring portions 15b extends in the direction perpendicular to the pressing direction and turns. When the pressing input operation is performed on the liquid crystal display device 11, the second spring portions 15b of the flexible members 15 extending in the direction perpendicular to the pressing direction and turning elastically deform in the pressing direction during the pressing input operation. When the actuator 14 oscillates, the first spring portions 15a of the flexible members 15 extending in the pressing direction elastically deform in the vibrating direction in which the actuator 14 causes the vibration. Because the first spring portions 15a and the second spring portions 15b of the flexible members 15 elastically deform, the liquid crystal display device 11 smoothly move relative to the base 12.

The liquid crystal display device 11 has the rectangular shape in the plan view. The pressure sensors 13 and the flexible members 15 are disposed at the corners of the liquid crystal display device 11. The actuator 14 is disposed on the inner side of the liquid crystal display device 11 in comparison to the pressure sensors 13 and the flexible members 15. Because the pressure sensors 13 and the flexible members 15 are disposed at the corners of the liquid crystal display device 11, the movements of the liquid crystal display device 11 relative to the base 12 due to the pressing input operations are allowed regardless of locations of the pressing input operations on the liquid crystal display device 11 having the rectangular shape in the plan view. Furthermore, the pressures exerted on the liquid crystal display device 11 during the pressing input operations are properly detected. The actuator 14 is located on the inner side of the liquid crystal display device 11 in comparison to the pressure sensors 13 and the flexible members 15. Therefore, the entire liquid crystal display device 11 can properly vibrate.

The liquid crystal display device 11 include the liquid crystal panel 11a (the display panel) and the touch panel pattern 11TP. The liquid crystal panel 11a includes the display surface 11DS for displaying images. The touch panel pattern 11TP detects locations of the pressure input operations on the display surface 11DS. When the pressing input operation is performed based on an image displayed on the display surface 11DS of the liquid crystal panel 11a, the location of the pressing input operation is detected by the touch panel pattern 11TP. The vibration of the liquid crystal display device 11 caused by the actuator 14 can be controlled based on the location of the pressing input operation detected by the touch panel pattern 11TP.

Second Embodiment

A second embodiment of the present invention will be described with reference to FIG. 10. The second embodiment includes actuators 114 that are different from that of the first embodiment. Configuration, functions, and effects similar to those of the first embodiment previously described will not be described.

Figure 10:
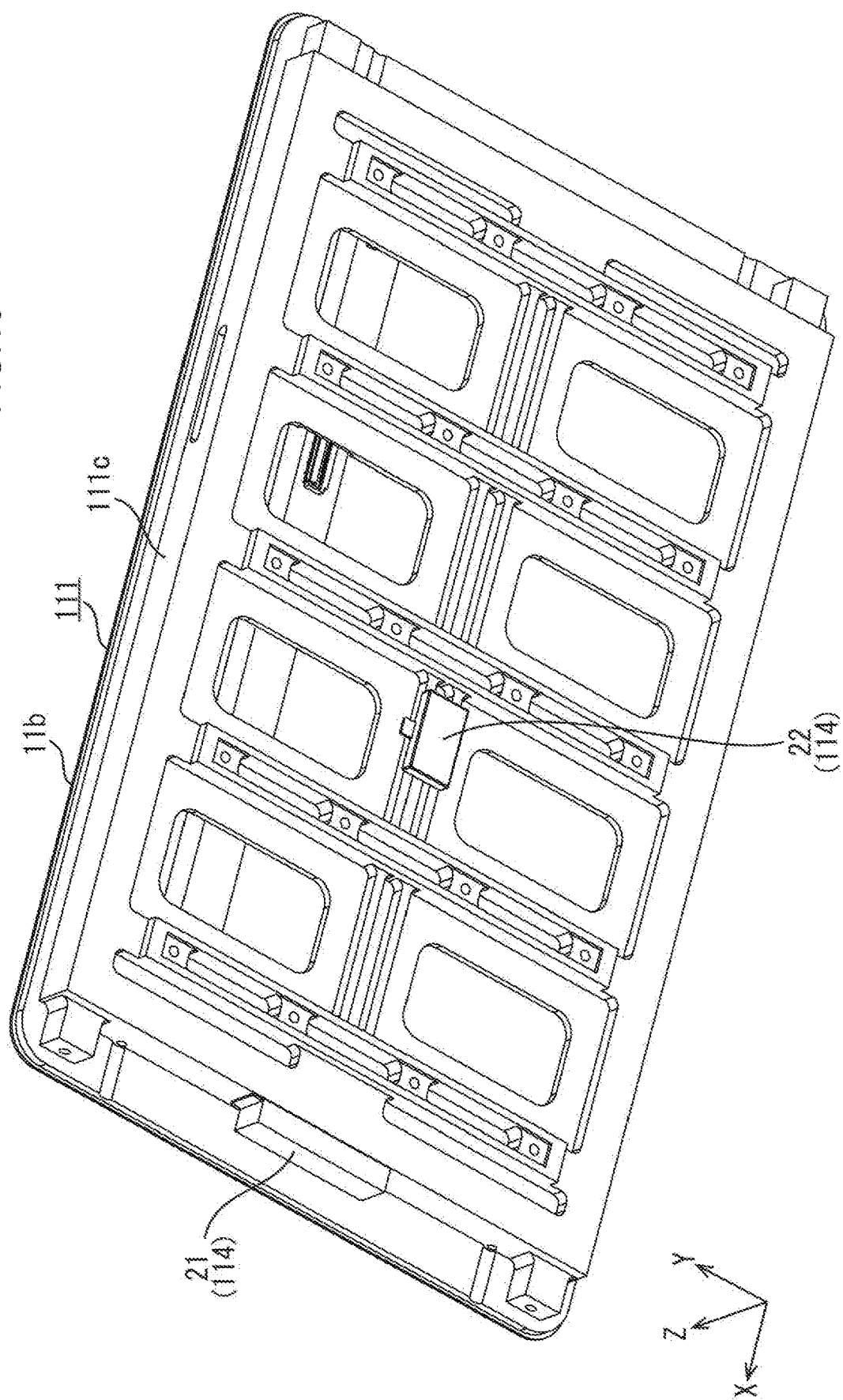
FIG. 10 is a perspective view of a liquid crystal display device to which the actuator included in the input device is mounted according to a second embodiment of the present invention.

As illustrated in FIG. 10, the actuators 114 in this embodiment include a piezo actuator 21 (a piezoelectric actuator) and a linear actuator 22. The piezo actuator 21 includes a piezo element (a piezoelectric element) as an oscillation source and uses the inverse piezoelectric effect. The piezo actuator 21 has an elongated block shape that extends in the Y-axis direction and oscillates in a thickness direction thereof. The piezo actuator 21 is mounted on an outer surface of a case 111c of a liquid crystal display device 111 with the thickness direction thereof corresponding with the X-axis direction. The linear actuator 22 includes an oscillator (a weight) and a coil. The oscillator is a magnetic body. When a current flows through the coil, a magnetic field is generated. The magnetic field is used for causing linear reciprocating motion of the oscillator resulting in oscillation of the linear actuator 22. The linear actuator 22 has an elongated block shape that extends in the X-axis direction and oscillates in a length direction thereof. The linear actuator 22 is mounted on a back surface of the case 111c of the liquid crystal display device 111 with the length direction thereof corresponding with the X-axis direction. The piezo actuator 21 and the linear actuator 22 are inertial drive actuators. The piezo actuator 21 and the linear actuator 22 are separated from the base (not illustrated for this embodiment) and attached exclusively to the liquid crystal display device 111. Namely, it is not necessary to attach the actuators 114 to the base in this embodiment.

As described above, the actuators 114 in this embodiment are the inertial drive actuators separated from the base and attached exclusively to the liquid crystal display device 111. According to the configuration, it is not necessary to attach the actuators 114 to the base.

Third Embodiment

A third embodiment of the present invention will be described with reference to FIGS. 11 to 13. The third embodiment includes flexible members 215 that are different from those of the first embodiment. Configuration, functions, and effects similar to those of the first embodiment previously described will not be described.

Figure 11:
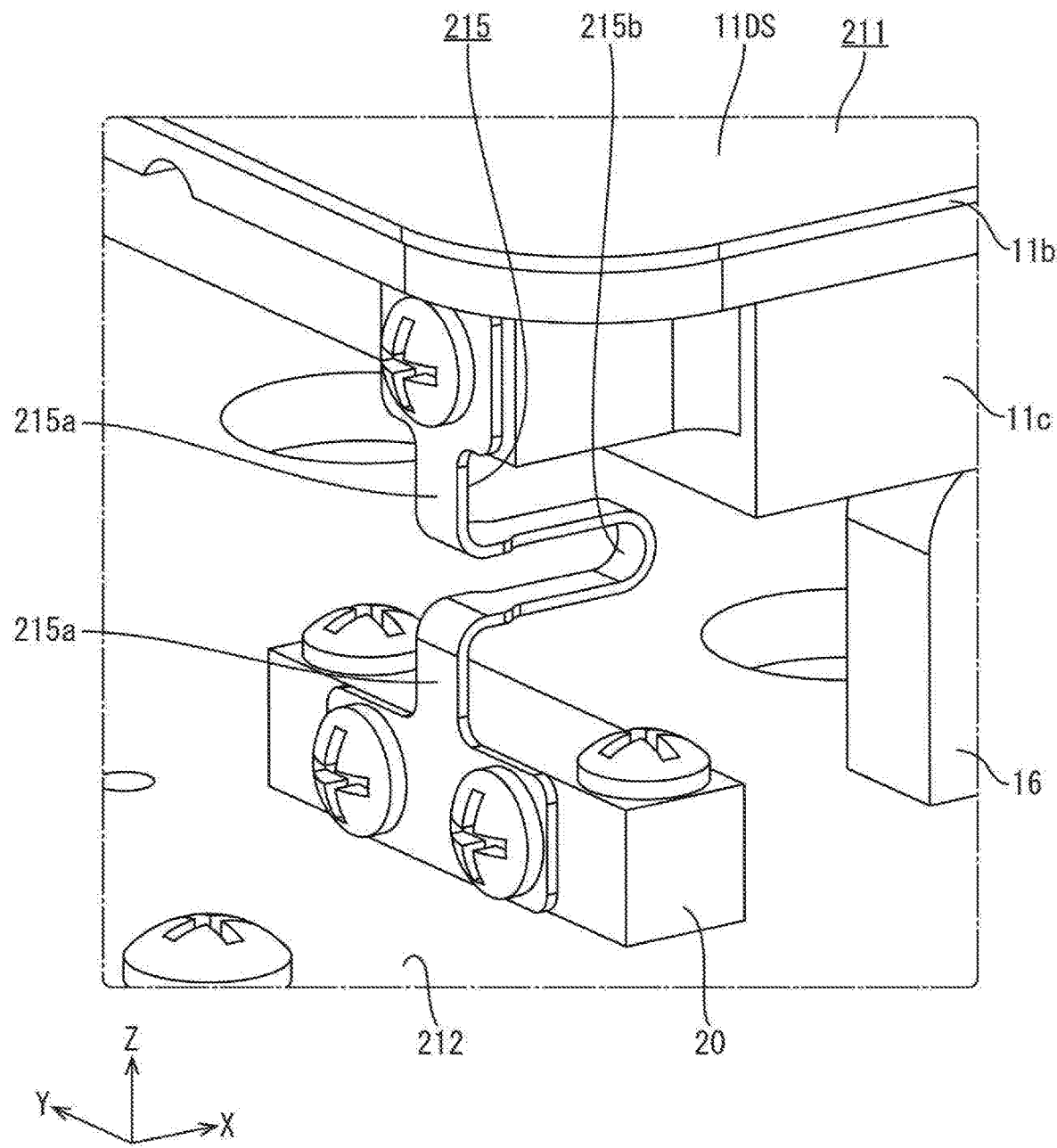
FIG. 11 is a magnified perspective view of a section of the input device including a flexible member according to a third embodiment of the present invention.
Figure 12:
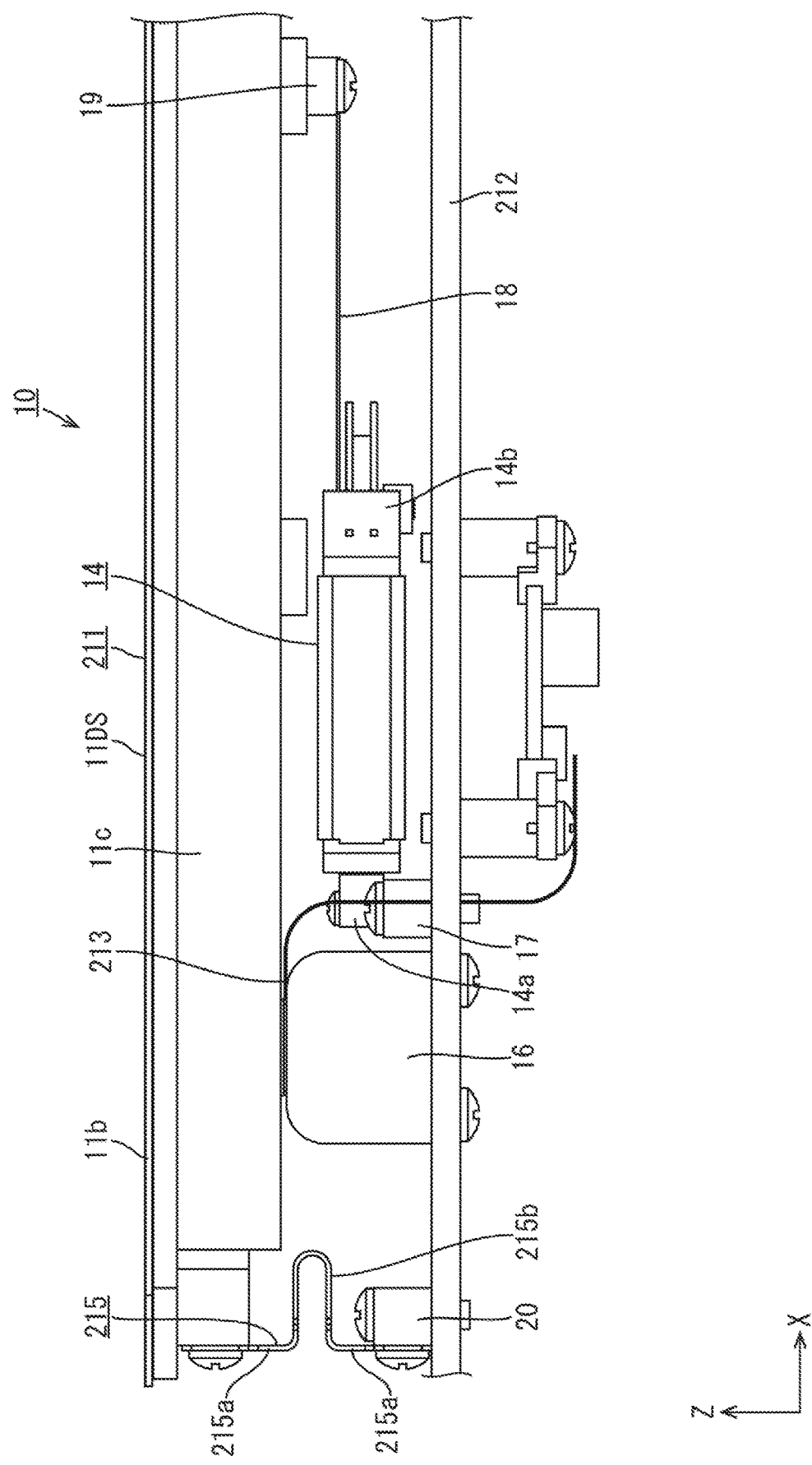
FIG. 12 is a magnified side view of a section of the input device including the flexible member, a pressure sensor, and an actuator.
Figure 13:
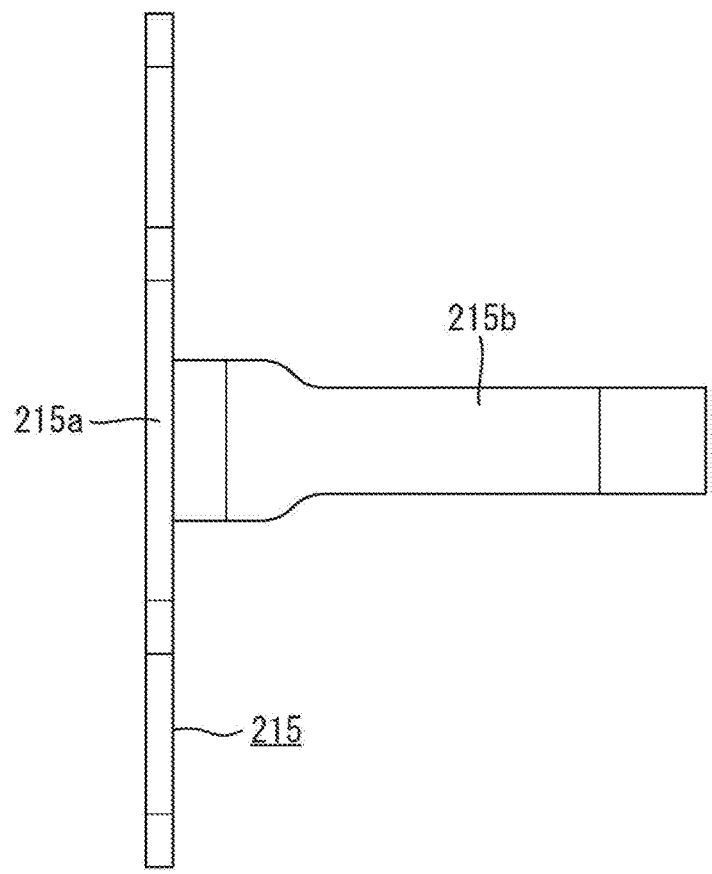
FIG. 13 is a plan view of the flexible member included in the input device.

As illustrated in FIGS. 11 to 13, the flexible members 215 in this embodiment include second spring portions 215*b* that have a width smaller than a width of first spring portions 215*a*. Specifically, sections of the second spring portions 215*b* coupled to the first spring portions 215*a* have a width equal to the width of the first spring portions 215*a* but sections of the second spring portions 215*b* including turning sections have the width smaller than the width of the first spring portions 215*a*. The sections including the turning sections play an active role in exerting spring forces. A length of the second spring portions 215*b* in the X-axis direction is larger than that of the first embodiment. In comparison to the first embodiment, the second spring portions 215*b* have lower mechanical strengths and the spring forces are reduced. Therefore, the second spring portions 215*b* more easily deform. When the pressing input operation is performed on a liquid crystal display device 211, the liquid crystal display device 211 more easily move in the Z-axis direction (the pressing direction) relative to a base 212. Even if the pressure exerted on the liquid crystal display device 211 during the pressing input operation is small, the pressure can be detected by the pressure sensors 213.

As described above, the flexible members 215 in this embodiment include the second spring portions 215*b* having the width smaller than the width of the first spring portions 215*a*. According to the configuration, the spring forces of the second spring portions 215*b* are smaller. When the pressing input operation is performed, the liquid crystal display device 211 more easily moves in the pressing direction relative to the base 212. Even if the pressure during the pressing input operation is small, the pressure can be detected by the pressure sensors 213.

Other Embodiment

The technology described herein is not limited to the embodiments described above and illustrated by the drawings. For example, the following embodiments will be included in the technical scope of the present invention.

(1) In each of the above embodiments, the second spring portion of each of the flexible members has the U shape when viewed from the side. However, the shape of the second spring portions may be altered where appropriate. For example, the second spring portions may have a V shape or a W shape when viewed from the side. Namely, the turning sections of the second spring portions may be sharply bent rather than curved.

(2) In each of the above embodiments, the second spring portion of each of the flexible members includes one turning section. However, each of the second spring portions may include two or more turning sections.

(3) The number or the arrangement of the pressure sensors, that of the actuator, and that of the flexible members may be altered from that of the above embodiments.

(4) In each of the above embodiments, the pressure sensors are provided using the pressure sensitive ink. However, pressure sensors including piezoelectric elements may be used.

(5) In each of the first and third embodiments, the electromagnetic actuator is used and the actuator includes the plate spring made of metal and attached to the movable portion. However, the plate spring may be made of synthetic resin. The shape or the structure of the plate spring may be altered.

(6) In each of the first and third embodiments, the electromagnetic actuator is used and the movable portion thereof is attached to the liquid crystal display device with the plate spring. However, the movable portion may be attached to the liquid crystal display device with a flexible member other than the plate spring. Alternatively, the plate spring may be omitted and the movable portion may be attached to the liquid crystal display device without the plate spring.

(7) In the second embodiment, the piezo actuator and the leaner actuator are used for the inertial drive actuators. However, other types of inertial drive actuators may be used.

(8) In the second embodiment, one piezo actuator and one linear actuator are mounted on the liquid crystal display device. However, the number and the location of the piezo actuator and the number and the location of the linear actuator in the liquid crystal display device may be altered where appropriate.

(9) In the third embodiment, the second spring portions of the flexible members are provided with the reduced spring forces. However, the second spring portions may be provided with increased spring forces. In such a case, the second spring portions may have a width larger than the width of the first spring portions or the length in the X-axis direction may be reduced in comparison to the first embodiment.

(10) In the third embodiment, the width of the second spring portions of the flexible members is reduced to reduce the spring force. However, the spring force of the second spring portions may be reduced by reducing the thickness of the second spring portions in comparison to the first spring portions.

(11) In each of the above embodiments, the touch panel pattern is the in-cell touch panel pattern embedded in the liquid crystal panel. However, the touch panel including an out-cell touch panel pattern on a front side of a liquid crystal panel may be used.

(12) In each of the above embodiments, the touch panel pattern is the self-capacitance type touch panel pattern. However, a mutual capacitance type touch panel pattern may be used. The shape of the touch electrodes included in the touch panel pattern in the plan view may be rectangular, round, or polygon including five or more vertices rather than diamond.

(13) In each of the above embodiment sections, the liquid crystal display device that includes the touch panel pattern is provided as an example. However, a liquid crystal display device that does not include a touch panel pattern may be provided as an example.

(14) In each of the above embodiments, the input device (or the liquid crystal display device or the base) has the horizontally-long rectangular shape in the plan view. However, the input device may have a horizontally-long rectangular shape, a square shape, an oval shape, an ellipse shape, a round shape, a trapezoidal shape, or a shape with a curved section.

(15) The application of the input device is not limited to the above embodiments.

(16) In each of the above embodiment sections, the liquid crystal display device that includes the liquid crystal panel is provided as an example. However, display devices that include other types of display panels (e.g., plasma display panels (PDPs), organic EL panels, electrophoretic display panels (EPDs), micro electro mechanical systems (MEMS)) may be used.

EXPLANATION OF SYMBOLS

10: Input device, 11, 111, 211: Liquid crystal display device (Input receiving member), 11a: Liquid crystal panel (Display device), 11DS: Display surface, 11TP: Touch panel pattern, 12, 212: Base, 13, 213: Pressure sensor, 14, 114: Actuator, 14a: Fixed portion, 14b: Movable portion, 15, 215: Flexible member, 15a, 215a: First spring portion, 15b, 215b: Second spring portion, 18: Plate spring

The invention claimed is:

1. An input device comprising:
an input receiving member on which a pressing input operation is performed;
a base to which the input receiving member is attached;
at least one pressure sensor disposed on the base to be in contact with the input receiving member and configured to detect a pressure exerted on the input receiving member during the pressing input operation;
an actuator disposed at least on the input receiving member and configured to vibrate the input receiving member in a direction perpendicular to a pressing direction in which the pressing input operation is performed; and
at least one flexible member attached to the input pressing member and the base, the at least one flexible member being elastically deformable in the pressing direction and a vibrating direction in which the actuator causes a vibration,
wherein the actuator is an electromagnetic actuator including:
a fixed portion attached to the base; and
a movable portion attached to the input receiving portion and movable in the vibrating direction relative to the fixed portion.

2. The input device according to claim 1, further comprising a plate spring extending in the vibrating direction and being elastically deformable in the pressing direction, the plate spring including:
a first end attached to the movable portion; and
a second end attached to the input receiving member.

3. The input device according to claim 1, wherein the actuator is an inertial drive actuator separated from the base and attached exclusively to the input receiving member.

4. The input device according to claim 1, wherein the at least one flexible member includes:
two first spring portions extending in the pressing direction and including first ends attached to the input receiving member or the base; and
a second spring portion coupled to second ends of the first spring portions, the second spring portion extending in a direction crossing the pressing direction and turning.

5. The input device according to claim 4, wherein the second spring portion has a width smaller than a width of the first spring portions.

6. The input device according to claim 1, wherein
the input receiving member has a rectangular shape in a plan view,
the at least one pressure sensor includes pressure sensors,
the at least one flexible member includes flexible members,
the pressure sensors and the flexible members are disposed at corners of the input receiving member, and
the actuator is disposed on an inner side of the input receiving member relative to the pressure sensors and the flexible members.

7. An input device comprising:
an input receiving member on which a pressing input operation is performed;
a base to which the input receiving member is attached;
at least one pressure sensor disposed on the base to be in contact with the input receiving member and configured to detect a pressure exerted on the input receiving member during the pressing input operation;
an actuator disposed at least on the input receiving member and configured to vibrate the input receiving member in a direction perpendicular to a pressing direction in which the pressing input operation is performed; and
at least one flexible member attached to the input pressing member and the base, the at least one flexible member being elastically deformable in the pressing direction and a vibrating direction in which the actuator causes a vibration, wherein
the at least one flexible member includes:
two first spring portions extending in the pressing direction and including first ends attached to the input receiving member or the base; and
a second spring portion coupled to second ends of the first spring portions, the second spring portion extending in a direction crossing the pressing direction and turning.

8. The input device according to claim 7, wherein the input receiving member comprises:
a display panel including a display surface for displaying an image; and
a touch panel pattern for detecting a location of the pressing input operation on the display surface.

9. The input device according to claim 7, wherein the second spring portion has a width smaller than a width of the first spring portions.

10. The input device according to claim 7, wherein the actuator is an inertial drive actuator separated from the base and attached exclusively to the input receiving member.

11. The input device according to claim 7, wherein
the input receiving member has a rectangular shape in a plan view,
the at least one pressure sensor includes pressure sensors,
the at least one flexible member includes flexible members,
the pressure sensors and the flexible members are disposed at corners of the input receiving member, and
the actuator is disposed on an inner side of the input receiving member relative to the pressure sensors and the flexible members.

12. An input device comprising:
an input receiving member on which a pressing input operation is performed;
a base to which the input receiving member is attached;
at least one pressure sensor disposed on the base to be in contact with the input receiving member and configured to detect a pressure exerted on the input receiving member during the pressing input operation;
an actuator disposed at least on the input receiving member and configured to vibrate the input receiving member in a direction perpendicular to a pressing direction in which the pressing input operation is performed; and
at least one flexible member attached to the input pressing member and the base, the at least one flexible member being elastically deformable in the pressing direction and a vibrating direction in which the actuator causes a vibration, wherein
the input receiving member has a rectangular shape in a plan view,
the at least one pressure sensor includes pressure sensors,
the at least one flexible member includes flexible members,
the pressure sensors and the flexible members are disposed at corners of the input receiving member, and
the actuator is disposed on an inner side of the input receiving member relative to the pressure sensors and the flexible members.

13. The input device according to claim 12, wherein the actuator is an inertial drive actuator separated from the base and attached exclusively to the input receiving member.

14. The input device according to claim 12, wherein the input receiving member comprises:
a display panel including a display surface for displaying an image; and
a touch panel pattern for detecting a location of the pressing input operation on the display surface.

* * * * *